United States Patent [19]

Fett

[11] 4,039,441
[45] Aug. 2, 1977

[54] COALESCING METHOD AND APPARATUS

[75] Inventor: Richard H. G. Fett, Poughkeepsie, N.Y.

[73] Assignee: The De Laval Separator Company, Poughkeepsie, N.Y.

[21] Appl. No.: 458,695

[22] Filed: Apr. 8, 1974

[51] Int. Cl.² ............................................. B01D 17/04
[52] U.S. Cl. .................................... 210/23 R; 210/80; 210/82; 210/274
[58] Field of Search ................... 196/46, 46.1; 210/23, 210/80, 81, 82, 264, 265, 274, 283, DIG. 5

[56] References Cited

U.S. PATENT DOCUMENTS

| | | | |
|---|---|---|---|
| 879,876 | 2/1908 | Jones et al. | 210/274 |
| 1,887,774 | 11/1932 | Meinzer | 210/23 X |
| 1,947,709 | 2/1934 | Garrison et al. | 210/265 X |
| 3,335,868 | 8/1967 | Schiffers | 210/274 |
| 3,491,882 | 1/1970 | Elam | 210/266 X |
| 3,710,949 | 1/1973 | Murkes | 210/522 |
| 3,717,251 | 2/1973 | Hampton | 210/80 |

FOREIGN PATENT DOCUMENTS 461,765  2/1937  United Kingdom ................... 210/80

*Primary Examiner*—Thomas G. Wyse
*Assistant Examiner*—R. G. Mukai
*Attorney, Agent, or Firm*—Cyrus S. Hapgood

[57] ABSTRACT

An oil and water mixture is fed under pressure to a lower chamber wherein any free oil rises to the upper part for discharge through an oil outlet while an emulsion of remaining oil and water is displaced upwardly through a baffle and a coalescing bed into an upper chamber having an upper outlet for coalesced oil and a lower outlet for separated water. To clean the coalescing bed, the mixture feed to the lower chamber is interrupted and the liquid level in the chambers is lowered to a region of the coalescing bed, after which gas is delivered under pressure to the liquid in the lower chamber so as to cause bubbling of the liquid in the bed, whereby dirt trapped therein is freed. The liquid level is then raised as the bubbling action continues, so that the dirt-containing liquid can be discharged from the upper chamber.

6 Claims, 1 Drawing Figure

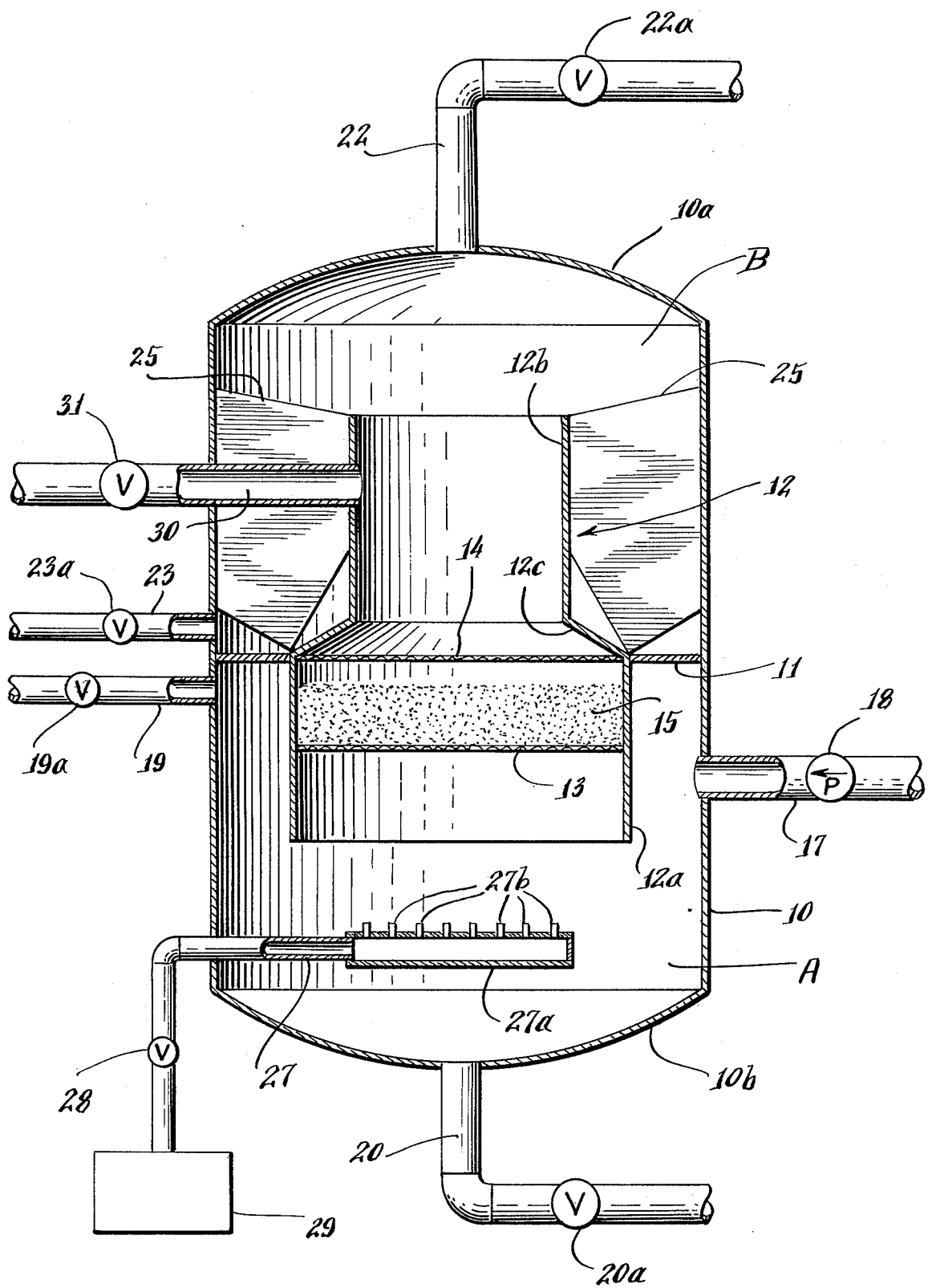

COALESCING METHOD AND APPARATUS

This invention relates to a method and apparatus for separating a mixture of liquids, at least partly emulsified, wherein the emulsion is forced through a coalescing bed to coalesce the dispersed phase, which is then separated by gravity from the other liquid. More particularly, the invention relates to an improved method and apparatus which provide for efficient cleaning of the coalescing bed.

It is known in the art to force an emulsified mixture of light and heavy liquids through a coalescing bed of granular material to enable an effective gravity separation of the two liquids. However, the mixture to be separated, such as water and oil, will often contain dirt of various kinds which becomes lodged on or between the granular particles of the bed and eventually results in serious impairment of the coalescing operation. Cleaning of the coalescing bed to remove these dirt particles prevents a problem which has not been solved satisfactorily heretofore.

In practicing the present invention, the emulsified mixture to be separated is fed under pressure into a lower chamber and thence upwardly through the coalescing bed into an upper chamber where the coalesced liquid (previously the dispersed phase of the emulsion) is separated by gravity from the other liquid, the two liquids being discharged separately through respective upper and lower outlets from the upper chamber. A liquid level is maintained in the upper chamber by continuing the feed of mixture to the lower chamber to replace the discharged separated liquids. According to the invention, cleaning of the coalescing bed is effected by interrupting the feed of the mixture to the lower chamber, lowering the liquid level from the upper chamber to a region of the bed, bubbling a gas upwardly through the liquid at this lowered level and into the bed, thereby causing a vigorous agitation which frees dirt trapped in the bed, and raising the liquid level into the second chamber and discharging dirt-laden liquid therefrom.

An apparatus made according to the invention comprises means dividing a housing into upper and lower chambers and including a pair of vertically spaced screen elements between which the coalescing bed of granular material is loosely retained, the bed and screen elements forming a generally vertical flow path between the chambers. The lower chamber has an inlet for the mixture to be separated and also has an upper outlet for discharging any free light liquid separated in this chamber, as well as a bottom outlet for discharging separated sludge and for draining liquid to effect the above-noted lowering of the liquid level. The upper chamber has upper and lower outlets for discharge of the separated light and heavy liquids, respectively. A duct leads into the lower chamber and has an outlet positioned to deliver gas to the coalescing bed from below the bed, and means are provided for delivering compressed gas intermittently to the duct.

For a more complete understanding of the invention, reference may be had to the accompanying drawing in which the single illustration is a vertical sectional view of one form of an apparatus according to the invention.

As illustrated, the new apparatus comprises a cylindrical housing 10 having a top 10a and a bottom 10b. Approximately midway between its top and bottom, the housing 10 is provided internally with a horizontal ring 11 secured to the side wall of the housing. Extending through the ring 11 and secured thereto, as by welding, is a vertical tubular member 12 having its axis coinciding with the vertical axis of the cylindrical housing 10. The tubular member 12 has a lower portion 12a forming an annular baffle depending from the inner edge of ring 11. Above the ring 11 the tubular member 12 has a portion 12b of reduced diameter and a conical portion 12c tapering upwardly from the annular baffle 12a to the reduced portion 12b.

Secured within the annular baffle 12a are a lower horizontal screen 13 and an upper horizontal screen 14. A bed of granular material 15 is located in the zone between the screens 13 and 14. The granular material 15 may be coated sand or a granulated or pelletized plastic material, and it occupies about two-thirds of the depth of the zone between screens 13 and 14, whereby it is free to float in this zone. The mesh of the screens 13 and 14 is smaller than the particle size of the granular material, so that the latter is loosely retained between the screens. If desired, the zone between the screens may be compartmentized so as to prevent migration of the granular material to one side of this zone.

As will be apparent from the foregoing, the parts 11, 13, 14 and 15 form a means dividing the interior of housing 10 into a lower chamber A and an upper chamber B, these chambers communicating with each other only by way of the generally vertical flow path through the screens 13-14 and the coalescing bed 15 within the central tubular member 12.

The lower chamber A has an inlet formed by pipe 17 in which a pump 18 is inserted for force-feeding of the liquid mixture to be separated. This feed mixture may be water containing only trace amounts of oil, that is, amounts up to 10,000 ppm. A pipe 19 forms a light liquid (oil) outlet from the upper part of chamber A and is provided with a valve 19a. Chamber A also has a bottom outlet formed by a pipe 20 provided with a valve 20a.

The upper chamber B has a top outlet for discharging separated light liquid and formed by a pipe 22 in which a valve 22a is inserted. A pipe 23 provided with a valve 23a forms a heavy liquid (water) outlet from the lower portion of chamber B. The annular space between the tubular parts 12b-12c and the surrounding housing wall may be provided with a series of inclined, radially-extending baffles 25 distributed evenly around the tubular member 12, these baffles serving as stratifying vanes for removing the last traces of oil from the water streaming toward the heavy liquid outlet 23.

A duct 27 leads into the lower chamber A where it terminates in a manifold 27a having upwardly directed nozzles 27b forming gas outlets below the tubular member 12. The duct 27 leads from a valve 28 communicating with a source 29 of compressed gas, which may be air or other suitable gas. The source 29 and valve 28 thus constitute a means for delivering compressed gas intermittently to the duct 27. Alternatively, such means may be constituted by a compressor connected directly to duct 27.

In the normal operation of the apparatus, pump 18 is operated to feed the oil-water into lower chamber A, all of the valves being closed except the water discharge valve 23a. With continued feeding by pump 18, some of the mixture is forced upwardly through the coalescing bed 15 and into the upper chamber B, where the water (heavy liquid) flows downward for discharge through outlet valve 23a. Free oil entering lower chamber A accumulates at the surface region of the liquid body surrounding the annular baffle 12a and is periodically discharged through outlet 19 by opening valve 19a. Likewise, the oil in upper chamber B, which has coalesced by passage of the emulsion through bed 15, accumulates at the liquid surface in this chamber and is periodically discharged through outlet 22 by opening valve 22a. The oil is forced out through the open outlets 19 and 22 by continuing to feed the oil-water mixture into lower chamber A, the discharging oil being displaced by incoming water.

When it is desired to clean the coalescing bed 15, pump 18 is stopped to arrest the feed into chamber A; and the drain valve 20a is opened to lower the liquid level so that it descends from upper chamber B to a region of a bed 15, preferably about midway between the top and bottom of the bed, whereupon the drain valve 20 is re-closed. Valve 28 is then opened to supply compressed gas through duct 27 and outlets 27b, whereby the gas bubbles upwardly through the liquid in lower chamber A and into and through the bed 15. The resulting vigorous agitation in the bed serves to free the dirt trapped therein. The feed by pump 18 is then resumed to raise the liquid level as the supplying of compressed gas continues, so that dirt is removed from the bed 15 by flotation. With continued operation of feed pump 18 while continuing the supply of compressed gas through outlets 27b, the liquid rises to the level of a drain duct 30. The latter leads from the interior of the upper portion 12b of tubular member 12 to the outside of housing 10, where duct 30 is provided with a normally closed valve 31. Thus, with valve 31 in its open position during the cleaning operation, the continued operation of feed pump 18 causes the dirt-water mixture to overflow into and through drain duct 30 to waste. The supply of compressed gas is subsequently stopped while continuing the operation of pump 18 to effect a flushing action.

Normal operation of the apparatus can then be resumed and continued until another cleaning of bed 15 is desired.

I claim:

1. In a coalescing apparatus comprising a housing, means dividing the interior of the housing into upper and lower chambers, said dividing means including a pair of vertically spaced screen elements and a coalescing bed of granular material loosely retained between said elements, said bed and screen elements forming a generally vertical flow path between said chambers, the lower chamber having an inlet for a mixture of relatively light and heavy liquids and also having an upper outlet for light liquid and a bottom outlet, baffle means located in the lower chamber between said upper outlet and said vertical flow path, the upper chamber having an upper outlet for light liquid and a lower outlet, a duct leading to said lower chamber and having an outlet positioned to deliver gas to the coalescing bed from substantially below said bed, and a compressed gas source associated with the duct for delivering compressed gas intermittently thereto.

2. A method comprising the steps of feeding an emulsified mixture of light and heavy liquids under pressure into a first chamber and thence upwardly through a coalescing bed into a second chamber, discharging separated liquids from upper and lower parts, respectively, of the second chamber, maintaining a liquid level in the second chamber by continuing said feeding of mixture to replace said discharged separated liquids, and cleaning the coalescing bed by interrupting said feeding of mixture, lowering the liquid level from the second chamber to a region of said bed, introducing a gas into the liquid in said first chamber at a region thereof substantially below said bed while maintaining said lowered level and while bubbling the gas upwardly through the liquid in said first chamber and into said bed to free dirt trapped therein, and then raising said liquid level to a region above said bed and discharging dirt-laden liquid by overflow from the raised liquid level.

3. The method of claim 2, in which said bubbling of the gas is continued during said raising of the liquid level.

4. The method of claim 2, which comprises also discharging free light liquid from the upper part of the first chamber and separately from said upward feeding through the coalescing bed.

5. The method of claim 2, in which said lowering of the liquid level is effected by draining liquid from the first chamber.

6. The method of claim 2, in which said raising of the liquid level is effected by resuming said feeding of the mixture.

* * * * *